UNITED STATES PATENT OFFICE.

MAHLON LOOMIS, OF WASHINGTON, DISTRICT OF COLUMBIA.

IMPROVEMENT IN TELEGRAPHING.

Specification forming part of Letters Patent No. 129,971, dated July 30, 1872.

*To all whom it may concern:*

Be it known that I, MAHLON LOOMIS, dentist, of Washington, District of Columbia, have invented or discovered a new and Improved Mode of Telegraphing and of Generating Light, Heat, and Motive-Power; and I do hereby declare that the following is a full description thereof.

The nature of my invention or discovery consists, in general terms, of utilizing natural electricity and establishing an electrical current or circuit for telegraphic and other purposes without the aid of wires, artificial batteries, or cables to form such electrical circuit, and yet communicate from one continent of the globe to another.

To enable others skilled in electrical science to make use of my discovery, I will proceed to describe the arrangements and mode of operation.

As in dispensing with the double wire, (which was first used in telegraphing,) and making use of but one, substituting the earth instead of a wire to form one-half the circuit, so I now dispense with both wires, using the earth as one-half the circuit and the continuous electrical element far above the earth's surface for the other part of the circuit. I also dispense with all artificial batteries, but use the free electricity of the atmosphere, co-operating with that of the earth, to supply the electrical dynamic force or current for telegraphing and for other useful purposes, such as light, heat, and motive power.

As atmospheric electricity is found more and more abundant when moisture, clouds, heated currents of air, and other dissipating influences are left below and a greater altitude attained, my plan is to seek as high an elevation as practicable on the tops of high mountains, and thus penetrate or establish electrical connection with the atmospheric stratum or ocean overlying local disturbances. Upon these mountain-tops I erect suitable towers and apparatus to attract the electricity, or, in other words, to disturb the electrical equilibrium, and thus obtain a current of electricity, or shocks or pulsations, which traverse or disturb the positive electrical body of the atmosphere above and between two given points by communicating it to the negative electrical body in the earth below, to form the electrical circuit.

I deem it expedient to use an insulated wire or conductor as forming a part of the local apparatus and for conducting the electricity down to the foot of the mountain, or as far away as may be convenient for a telegraph-office, or to utilize it for other purposes.

I do not claim any new key-board nor any new alphabet or signals; I do not claim any new register or recording instrument; but

What I claim as my invention or discovery, and desire to secure by Letters Patent, is—

The utilization of natural electricity from elevated points by connecting the opposite polarity of the celestial and terrestrial bodies of electricity at different points by suitable conductors, and, for telegraphic purposes, relying upon the disturbance produced in the two electro-opposite bodies (of the earth and atmosphere) by an interruption of the continuity of one of the conductors from the electrical body being indicated upon its opposite or corresponding terminus, and thus producing a circuit or communication between the two without an artificial battery or the further use of wires or cables to connect the co-operating stations.

MAHLON LOOMIS.

Witnesses:
  BOYD ELIOT,
  C. C. WILSON.